2,853,098

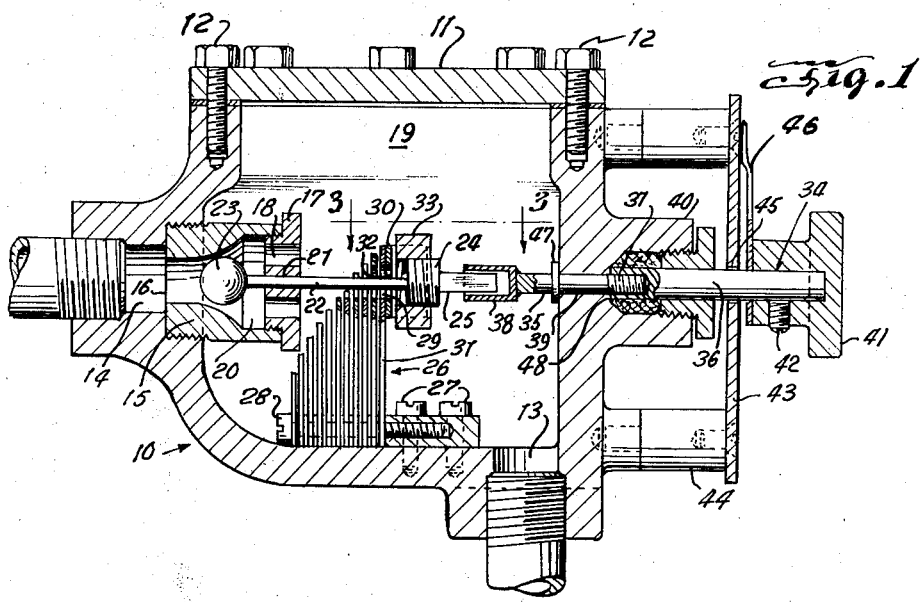

SELF COMPENSATING FLOW REGULATOR

Roland W. Fritzsche, Dallas, Tex.

Application February 20, 1956, Serial No. 566,431

1 Claim. (Cl. 137—517)

This invention relates to improvements in flow regulators, particularly to flow-regulating devices for controlling the flow of volatile fluids.

When ammonia, for example, is transported in a conduit from a closed container through conventional flow-regulators to a point of discharge by means of a pressure difference between the pressure in the container and the pressure at the discharge point, some of the fluid flashes into vapor. These regulators operate in two stages, the first of which generally comprises means for holding a pressure differential constant, while the second stage comprises means for varying the area of restriction for the purpose of regulating the fluid-flow rate.

Two stage devices such as described in the foregoing paragraph are unsatisfactory in performance when applied to control the rate of flow of volatile fluids, the reason being that the pressure drop occurring in the first stage causes a two phase mixture (partial evaporation) to enter the second stage. Several inconstant factors influence and determine the proportion of this vapor-liquid mixture, so that the mixture passing into the second stage of such a device is an irregular variable. The vapor of this mixture too frequently absorbs sufficient heat to cause freezing of moisture, always present, within the valve, and thus upset all regulation and even stop the fluid-flow entirely.

It follows, of course, that one object of the invention is to provide a valve having its flow-restricting passage positioned within the valve at its outlet end in such manner that all flashing of the fluid will occur at a point downstream from the valve and so prevent freezing within the valve.

The principal object, however, of the invention is to provide a flow-regulating valve having a single stage of pressure reduction, which incorporates means for presetting the valve for any rate of fluid-flow by selectively changing the area of flow-restriction, and means by which the valve is self-compensating for pressure changes occurring in the fluid before it enters the valve and after it has been discharged therefrom.

Uniform flow regulation is obtained by relating a change in area to a change in the pressure difference through the area of flow in a restricted passage. This may be represented mathematically by the formula $Q = KA(2gH)^{1/2}$, where the quantity (Q) is proportional to the area (A) and the square-root of the pressure difference $(H)^{1/2}$, in which the product of the area and the square-root of the pressure difference is held constant. In the invention this is accomplished by the interrelated effects of a special orifice and a spring retarded plug within the orifice, responsive to the pressure differential over the orifice, for any one valve setting.

The special orifice has the form of an elongated passage, circular in all transverse plane-sections at right angle to the longitudinal axis, and uniformly contoured between its inlet and outlet in all plane sections passing through its longitudinal axis.

Broadly, the valve has a free inlet and a restricted outlet in the form of the orifice described above. A spring in the valve-body engages the stem of a spherical plug, centered within the orifice, by means of an adjustable connection to position the plug with respect to the orifice and spring. A hand-wheel mounted exteriorly on the valve body is arranged to move the plug inwardly and outwardly within the orifice, when the hand wheel is turned. A graduated dial is mounted on the valve-body beneath the hand-wheel, and a pointer is supported on the base of the hand-wheel over the dial to indicate the degree of turning and adjustment.

In the drawings,

Fig. 1 is an elevational section view taken through the valve on a vertical plane passing through the longitudinal axis.

Fig. 2 is a top plan view of the valve.

Fig. 3 is a top plan view of the connection between the spring and the plug-stem, and the connection between the plug-stem and the adjusting hand-wheel stem.

Continuing with a more detailed description of the invention reference numeral 10, Fig. 1, of the drawings, designates generally the valve-body which has a removable cover 11 secured by the screws 12. The valve-body has the free inlet 13 and the outlet 14, restricted by the orifice 15 mounted within the valve-body at the outlet-opening 16 and concentric with it. The orifice has the head plate 17 containing one or more passages 18 connecting the interior 19 of the valve-body with the entrance 20 of the orifice. A bearing 21 at the center of the headplate supports the stem 22 on one end of which a spherical plug 23 is mounted for movement within the orifice. A threaded round bar 24 is mounted on the opposite end of the plug-stem, and has a square shank 25 extending from it.

A spring 26, made of laminated flats, or leaves, is mounted inside the valve-body by the screws 27 and 28, with the leaves substantially perpendicular to the plug-stem, the longer leaves of the spring being provided with openings 29, for example, through which the plug-stem passes. A yoke 30, mounted on the first spring-leaf 31, is provided with an opening 32 through which the plug-stem also passes. The yoke pivotedly supports an annular ring 33, threaded on the interior, which engages the threaded bar mounted on the plug-stem, already described.

The shaft 34 is made of two parts 35 and 36, joined by a separatable connection 37. A square sleeve 38 is mounted on one end of the shaft-part 35, and arranged to engage the square shank 25 previously described. The shaft is supported in the bearing 39 and the conventional stuffing-box 40, formed in the valve-body, and extends exteriorly therefrom for receiving the knob 41 which is secured thereon by set-screw 42.

A graduated dial 43 is mounted on the valve-body by the stud-extensions 44 over the shaft, which passes through the opening 45 at the center of the dial. On the under-side of the knob 41 a pointer 46 is mounted to indicate the position of the knob at any setting.

The shaft is held against longitudinal movement by the collar 47 which bears against the interior of the valve-body and by the part 36 of the shaft which bears on the shoulder 48 formed in the stuffing-box.

The spring is calibrated by varying the length of the leaves and the width of the spacers between the leaves, to conform with the change in the restricted area of passage within the orifice effected by a change in the position of the spherical plug. Since the movement of the spherical plug is dependent upon the change in pressure difference across the area of restriction between the inner surface of the orifice and the plug, any change in either pressure will shift the plug and the spring. The position of the plug is adjusted by turning the knob until the desired rate of flow is obtained which at the same time balances the spring with the head pressure against the plug. Now if the head pressure increases the plug moves inwardly to reduce the area of restriction to maintain the same rate of flow, simultaneously putting the spring in balance again with the head pressure.

As the head pressure decreases to the pressure existing at the time the valve was adjusted, the plug moves outwardly to restore the initial pressure differential and thus maintain constant flow-rate. The same cycle occurs when the final pressure at the orifice discharge decreases, as occurs when the head pressure increases, explained above. The foregoing, of course, holds only where there is a substantially free discharge beyond the orifice. Clogging and stoppage of the discharge will cause the final pressure to rise to equal the head pressure. This concludes the description of the invention.

Manifestly, the construction as shown and described is capable of some modification, and such modification as may be construed to fall within the scope and meaning of the appended claim is also considered to be within the spirit and intent of the invention.

What is claimed is:

An automatic fluid flow control valve, adapted to be operated by a pressure difference across the valve, comprising a body having a bottom inlet and a side outlet, a restricted orifice in the outlet, a longitudinally movable stem aligned axially with the orifice, a ball valve attached to one end of the stem for movement relative to the orifice, a threaded round bar connected to the opposite end of the stem and having a square shank extending from it, an internally threaded ring threaded on the threaded round bar, a spring consisting of a plurality of co-acting leaves, of different lengths, each having one end attached to the inner wall of the body, a yoke attached to the opposite end of one of the leaves and pivotally connected to the internally threaded ring, the yoke and at least one of the leaves having openings therein surrounding the stem, the arrangement being such that the valve is yieldably positioned in spaced relation to the orifice by the action of the spring, a shaft aligned with the stem and having a square socket on one end for engagement with the square shank, the shaft extending through the body opposite the outlet, a knob attached to the outer end of the shaft, the arrangement being such that the initial spacing of the valve relative to the orifice may be predetermined by manipulating the knob, a dial formed on the exterior surface of the body, and a pointer rotatable with the knob and co-acting with the dial whereby the initial spacing of the valve relative to the orifice may be determined by visual inspection.

References Cited in the file of this patent

UNITED STATES PATENTS

| | | |
|---|---|---|
| 2,402,729 | Buchanan | June 25, 1946 |
| 2,450,535 | Watson | Oct. 5, 1948 |
| 2,495,338 | Loweke | Jan. 24, 1950 |
| 2,591,090 | Newman | Apr. 1, 1952 |
| 2,735,669 | Seiler | Feb. 21, 1956 |
| 2,796,889 | Treganowan | June 25, 1957 |

FOREIGN PATENTS

| | | |
|---|---|---|
| 735,640 | Great Britain | Aug. 24, 1955 |